(12) United States Patent
Kuo et al.

(10) Patent No.: US 8,100,050 B2
(45) Date of Patent: *Jan. 24, 2012

(54) GRILL DEVICE WITH A REMOVABLE GRILL PLATE

(75) Inventors: Po-Chun Kuo, Tainan Hsien (TW); Yeh-Ping Lin, Yung-Kang (TW)

(73) Assignee: Star Comgistic Capital Co., Ltd., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 10/923,484

(22) Filed: Aug. 20, 2004

(65) Prior Publication Data
US 2005/0247209 A1 Nov. 10, 2005

(30) Foreign Application Priority Data
May 7, 2004 (TW) .............................. 93112847 A

(51) Int. Cl.
*A47J 37/06* (2006.01)
(52) U.S. Cl. ............................... 99/349; 99/349; 99/378
(58) Field of Classification Search ............ 99/326–333, 99/339, 340, 372–384, 389, 400, 401, 422–426, 99/444–450, 483, 485; 219/450.1, 451.1, 219/451.4, 448.11, 446.1, 521–524, 525, 219/538, 441, 442, 386; 426/523; 220/315, 220/318
See application file for complete search history.

(56) References Cited

U.S. PATENT DOCUMENTS

| | | | | |
|---|---|---|---|---|
| 2,230,728 A * | 2/1941 | Propernick | .................... | 99/343 |
| 2,558,668 A * | 6/1951 | Bjork | ............................... | 99/299 |
| 3,006,270 A * | 10/1961 | Graham | ......................... | 99/425 |
| 4,091,720 A * | 5/1978 | Wheeler | ......................... | 99/375 |
| 4,150,609 A | 4/1979 | McClean | | |
| 4,178,500 A * | 12/1979 | Brindopke | .................... | 219/524 |
| 5,129,313 A * | 7/1992 | Coppier | ......................... | 99/376 |
| 5,363,748 A * | 11/1994 | Boehm et al. | .................. | 99/372 |
| 6,130,416 A | 10/2000 | Gabbai | | |
| 6,269,738 B1 * | 8/2001 | Huang | ............................ | 99/375 |
| 6,393,970 B1 * | 5/2002 | Wu | ................................ | 99/331 |
| 6,401,601 B1 * | 6/2002 | Wu | ................................ | 99/331 |
| 6,429,409 B1 * | 8/2002 | Siu | ............................ | 219/450.1 |
| 6,758,132 B1 * | 7/2004 | Kuo et al. | ....................... | 99/340 |
| 6,820,537 B2 * | 11/2004 | Patenotre | ....................... | 99/331 |
| 6,849,830 B2 * | 2/2005 | Damiano et al. | .............. | 219/386 |
| 2004/0069767 A1 * | 4/2004 | Haasis et al. | ................ | 219/465.1 |
| 2005/0025685 A1 * | 2/2005 | Selig et al. | ..................... | 422/292 |
| 2005/0247210 A1 * | 11/2005 | Ragan | ............................ | 99/372 |
| 2008/0216669 A1 * | 9/2008 | Kuo et al. | ........................ | 99/372 |

FOREIGN PATENT DOCUMENTS

EP 0 696 430 2/1996
EP 0 928 592 7/1999

* cited by examiner

*Primary Examiner* — Geoffrey S Evans
(74) *Attorney, Agent, or Firm* — Ladas & Parry LLP

(57) ABSTRACT

A grill member of a grill device includes a housing, a grill plate, a heating unit, and a handle unit. The housing is formed with a latch hole. The grill plate is made of a heat-conductive material and is disposed removably on the housing. The heating unit is mounted on the housing and is operable so as to generate heat that is conducted to the grill plate. The handle unit is movably retained on the grill plate and is operable so as to engage releasably the latch hole in the housing, thereby locking releasably the grill plate on the housing.

8 Claims, 7 Drawing Sheets

GRILL DEVICE WITH A REMOVABLE GRILL PLATE

CROSS-REFERENCE TO RELATED APPLICATION

This application claims priority of Taiwanese application No. 093112847, filed on May 7, 2004.

BACKGROUND OF THE INVENTION

1. Field of the Invention

The invention relates to a grill device, more particularly to a grill device with a removable grill plate.

2. Description of the Related Art

Conventional grill devices are disadvantageous in that it is inconvenient to clean a grill plate thereof. Moreover, during cleaning, water is prone to flow into the grill device such that electric components in the grill device tend to be damaged. To overcome the aforesaid drawback, it has been proposed heretofore to provide a grill device with a removable grill plate. However, removal of the grill plate from the known grill device is a troublesome task. In addition, the electric heating element inside the known grill device is exposed upon removal of the grill plate, which can result in damage when an object accidentally drops into the grill device.

SUMMARY OF THE INVENTION

Therefore, the object of the present invention is to provide a grill device that can overcome the aforesaid drawbacks associated with the prior art.

According to one aspect of the present invention, there is provided a grill device that comprises a grill member, which includes a housing, a grill plate and a heating unit. The grill plate is made of a heat-conductive material, and is retained removably on the housing. The heating unit includes a heating element disposed in the housing, and a heat-conductive plate mounted on the housing and disposed between the heating element and the grill plate for conducting heat from the heating element to the grill plate.

According to another aspect of the present invention, there is provided a grill device that comprises a grill member, which includes a housing, a grill plate, a heating unit and a handle unit. The housing is formed with a latch hole. The grill plate is made of a heat-conductive material, and is disposed removably on the housing. The heating unit is mounted on the housing, and is operable so as to generate heat that is conducted to the grill plate. The handle unit is movably retained on the grill plate, and is operable so as to engage releasably the latch hole in the housing, thereby locking releasably the grill plate on the housing.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
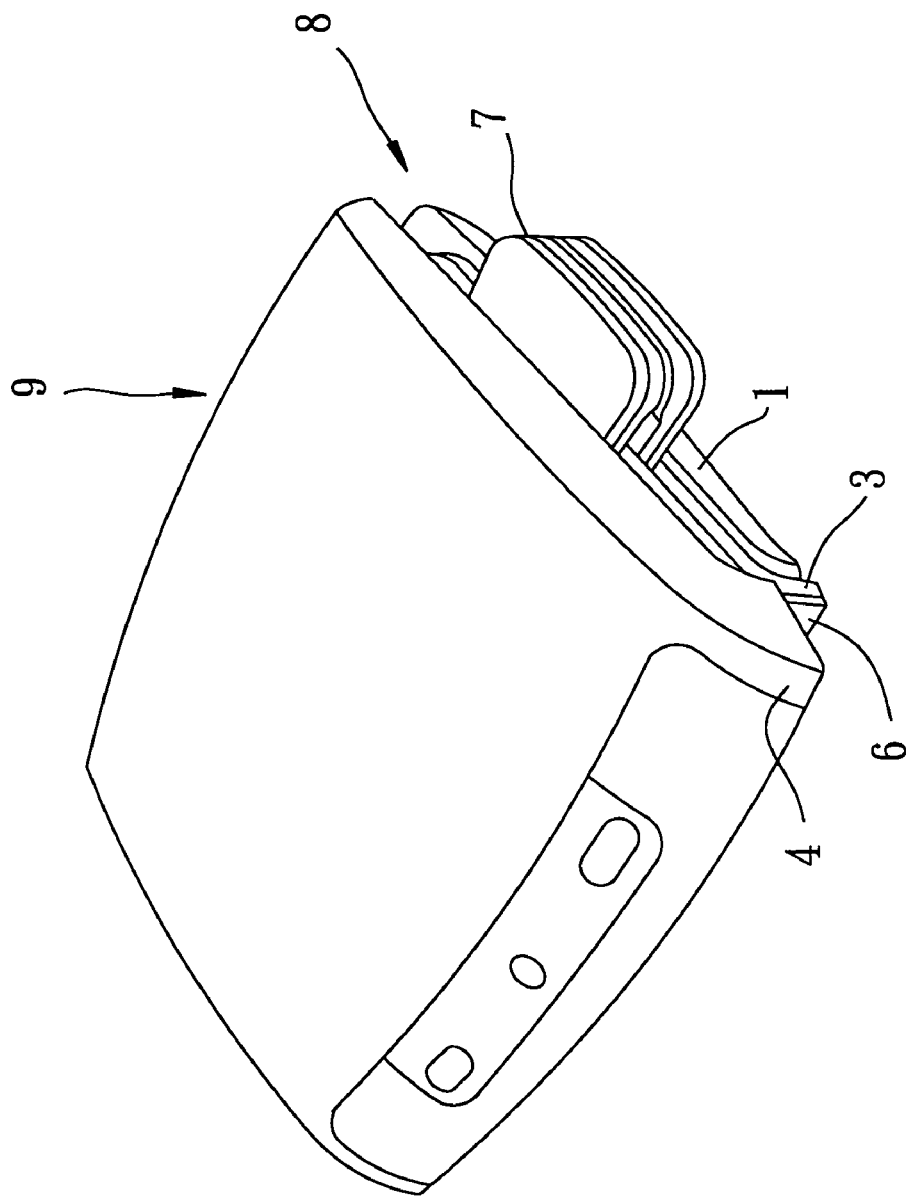
FIG. 1 is a perspective view of the preferred embodiment of a grill device according to the present invention, illustrating a closed state of upper and lower grill members of the grill device.
Figure 2:
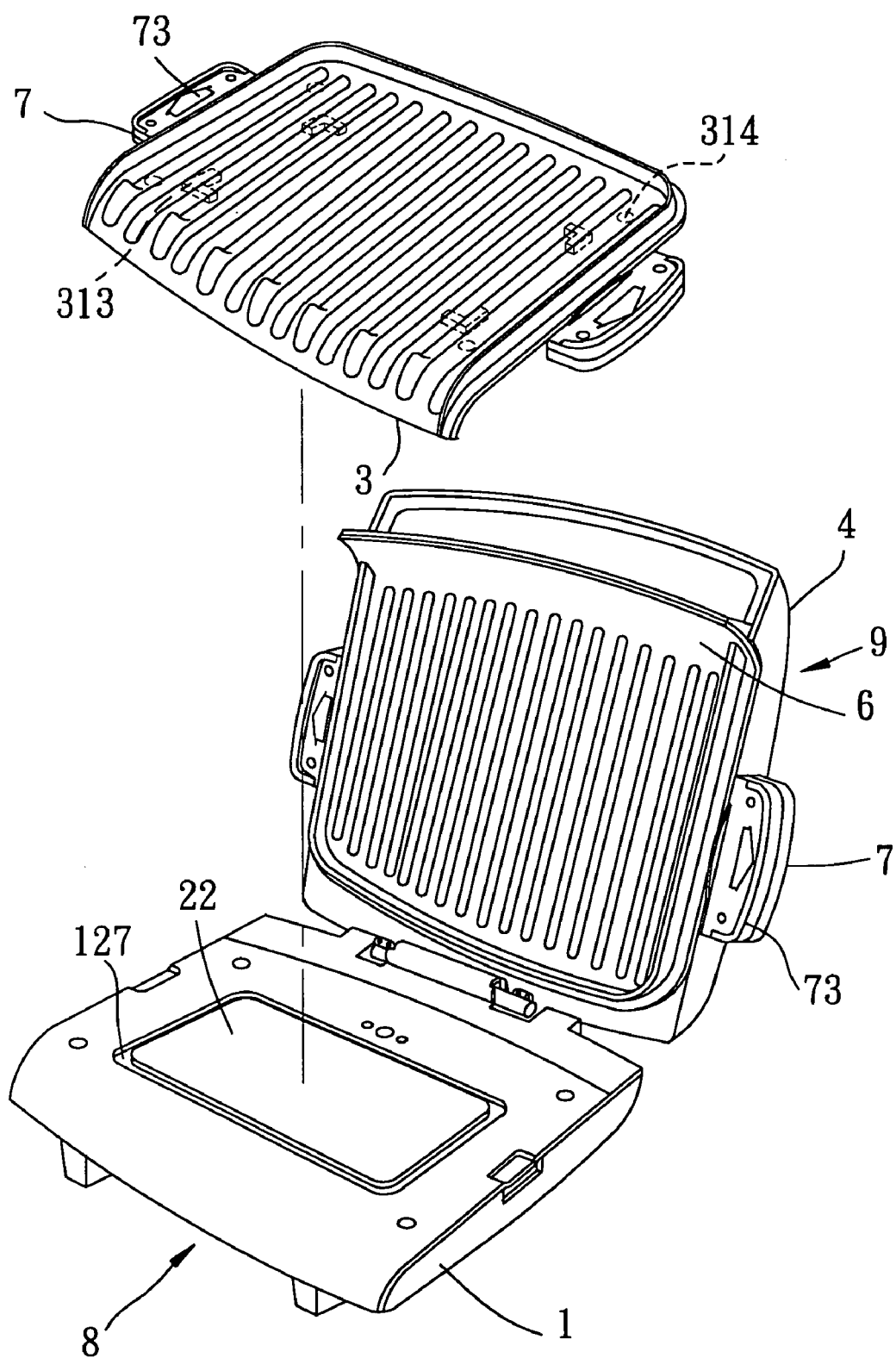
FIG. 2 is another perspective view of the preferred embodiment, illustrating an opened state of the upper and lower grill members.

Referring to FIGS. 1 and 2, the preferred embodiment of a grill device according to the present invention is shown to comprise upper and lower grill members 9, 8 that are movable relative to each other from a closed position (see FIG. 1) to an opened position (see FIG. 2).

Figure 3:
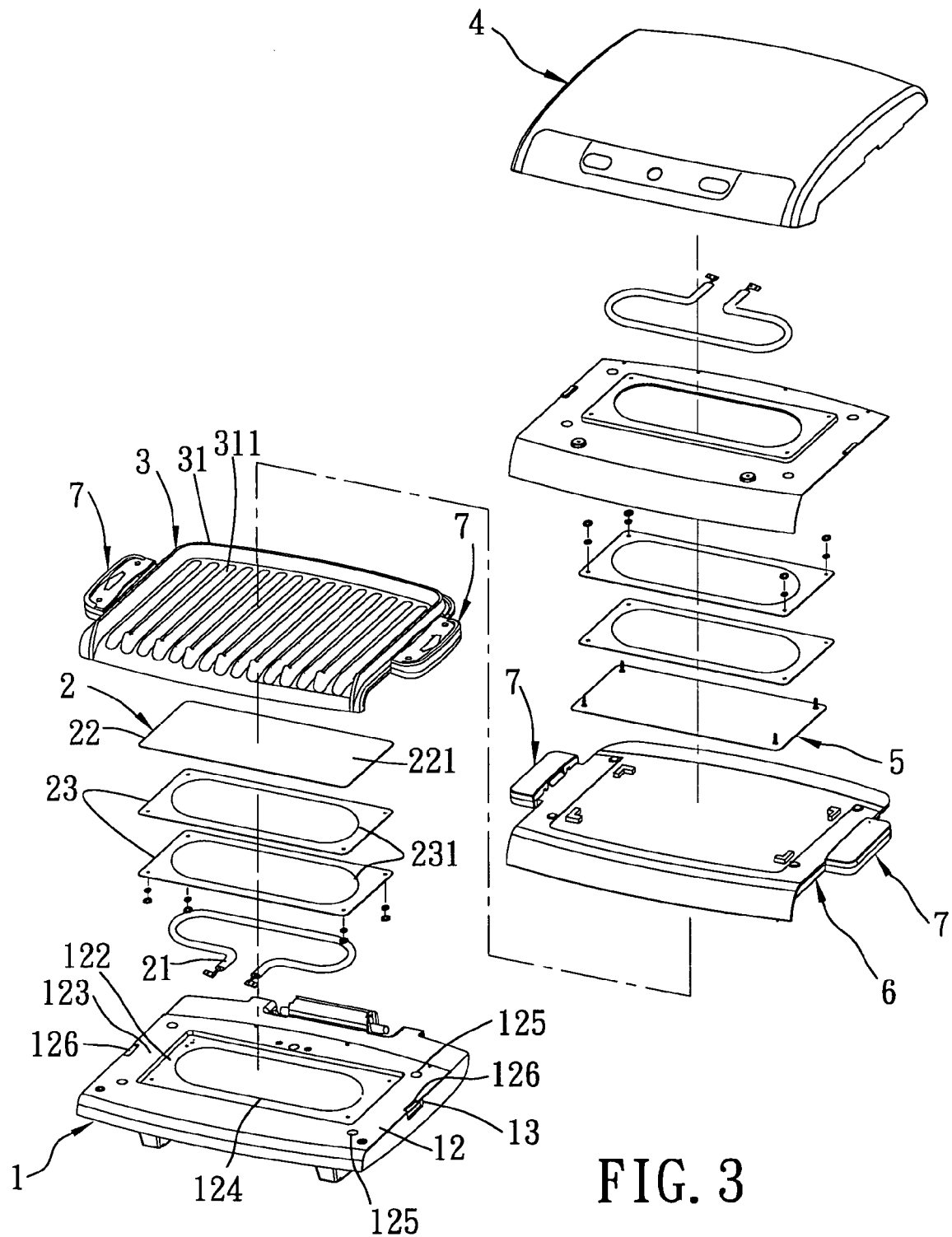
FIG. 3 is an exploded perspective view of the preferred embodiment.

Referring to FIGS. 2 and 3, the lower grill member 8 includes a housing 1, a heating unit 2, a grill plate 3, and a pair of handle units 7. The upper grill member 9 also includes a housing 4, a heating unit 5, a grill plate 6, and a pair of handle units 7. The housings 1, 4 of the upper and lower grill members 9, 8 are coupled pivotally to each other in a conventional manner, thereby permitting relative movement of the grill members 9, 8 between the aforesaid closed and opened positions. Since the upper grill member 9 is similar to the lower grill member 8 in construction, only the lower grill member 8 will be described in detail herein for the sake of brevity.

Figure 4:
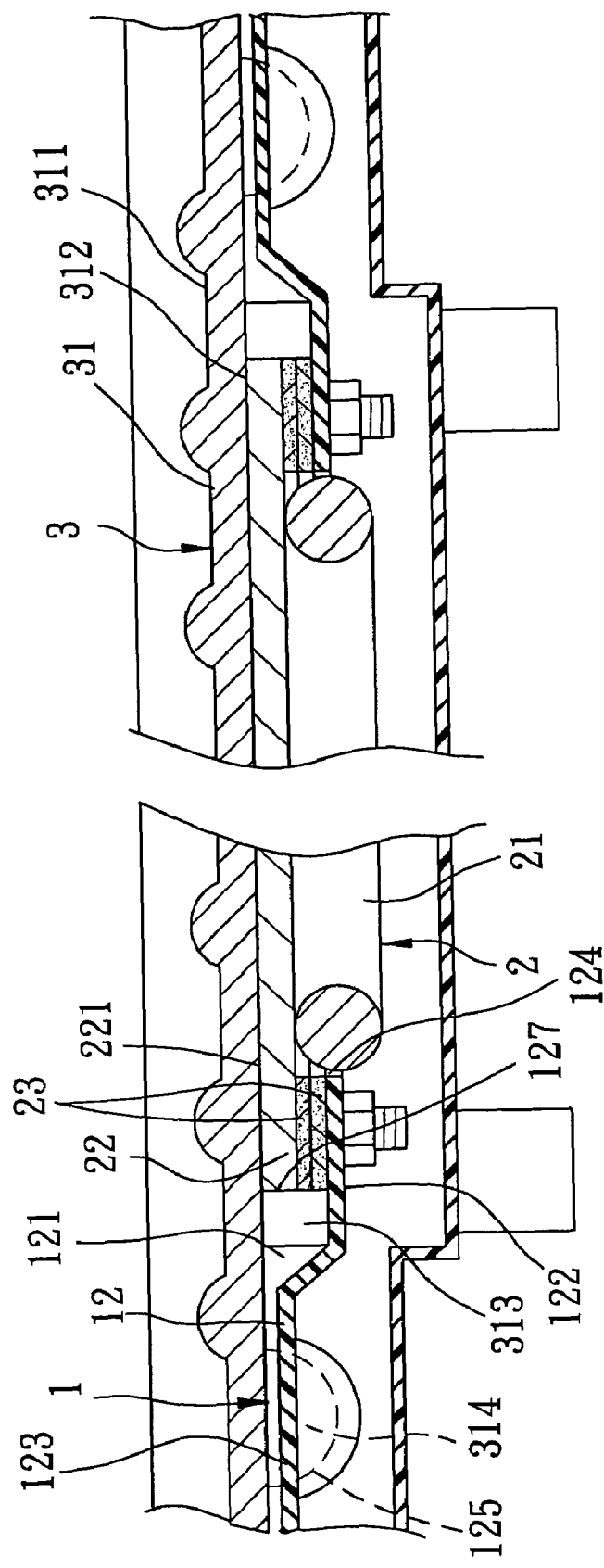
FIG. 4 is a fragmentary schematic sectional view of the lower grill member.
Figure 7:
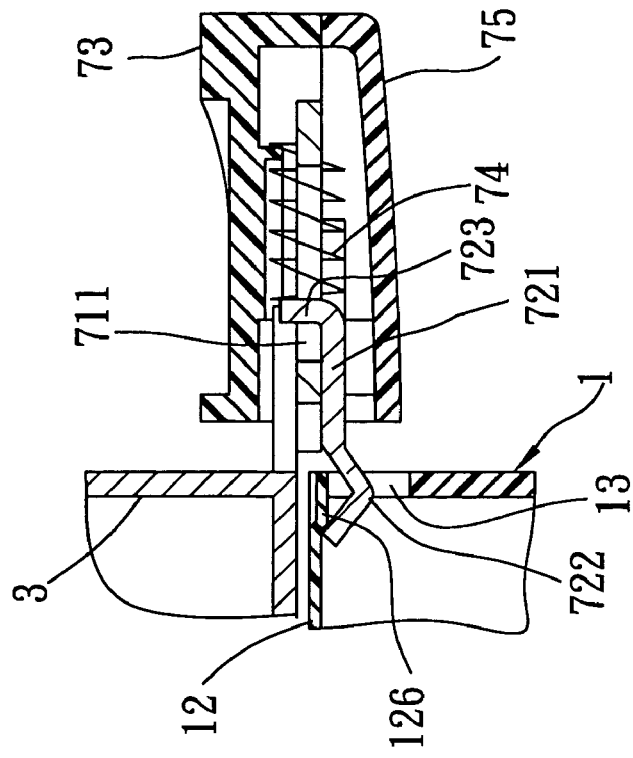
FIG. 7 is a fragmentary schematic sectional view of the handle unit when in the state shown in FIG. 6.

With further reference to FIG. 4, the housing 1 has a heat-radiating side 12 and a pair of lateral sides, each of which is formed with a latch hole 13. The heat-radiating side 12 is formed with a mounting region 122 and a surrounding region 123 that surrounds and that forms a vertical clearance with the mounting region 122, thereby configuring the heat-radiating side 12 with a mounting space 121 surrounded by the surrounding region 123. The mounting region 122 is formed with a first opening 124. The heat-radiating side 12 is further formed with four positioning recesses 125 in the surrounding region 123. The surrounding region 123 is punched to form a stepped periphery 126 for each of the latch holes 13, as best shown in FIG. 7.

The heating unit 2 includes an electric heating element 21, a heat-conductive plate 22, and a pair of heat insulators 23. The heating element 21 is disposed in the housing 1. The heat-conductive plate 22 is mounted on the heat-radiating side 12 of the housing 1, spans the first opening 124, and is disposed between the heating element 21 and the grill plate 3 for conducting heat from the heating element 21 to the grill plate 3. The heat insulators 23 are stacked between the heat-conductive plate 22 and the heat-radiating side 12 to prevent contact therebetween. By virtue of the heat insulators 23, the heat-conductive plate 22 is disposed such that a plate-contacting side 221 thereof projects relative to the heat-radiating side 12 of the housing 1, as best shown in FIG. 4. Each of the heat insulators 23 is formed with a second opening 231 that is registered with the first opening 124. The heating element 21 extends into the first and second openings 124, 231, and is in contact with the heat-conductive plate 22. The heat insulators 23 and the heat-conductive plate 22 are disposed in the mounting space 121 and cooperate with the surrounding region 123 to form a limit groove 127 around the heating unit 2, as best shown in FIG. 2. In this embodiment, the heat insulators 23 are made of mica. It should be noted herein that the number of the heat insulators 23 is not limited to two, and can vary depending on actual requirements.

Figure 5:
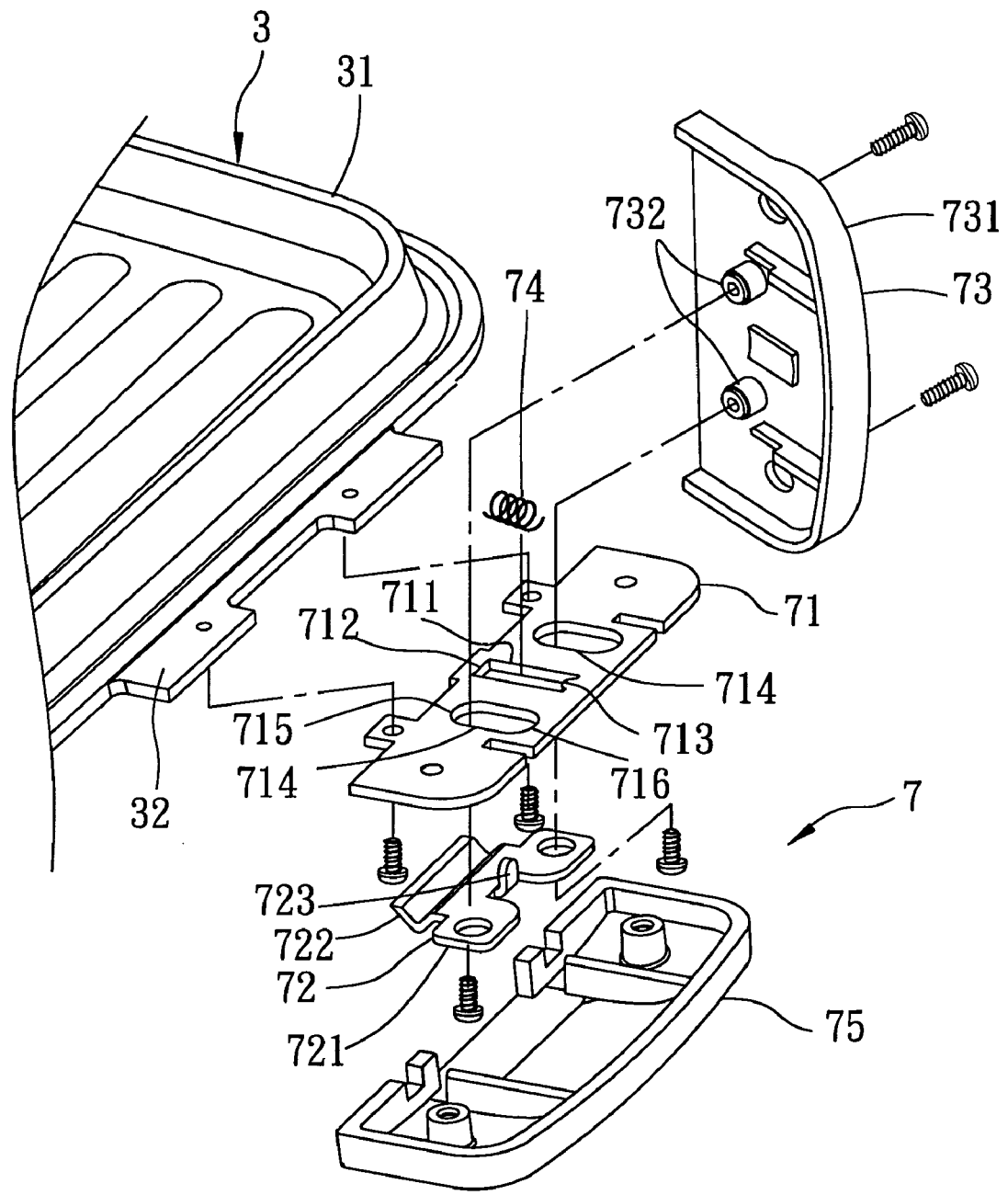
FIG. 5 is a fragmentary exploded perspective view to illustrate a handle unit of the lower grill member.

The grill plate 3 is made of a heat-conductive material, and is retained removably on the housing 1. With reference to FIGS. 4 and 5, the grill plate 3 is shown to include a heat-conductive plate body 31 that has a grilling side 311 for grilling foodstuff, a heating side 312 opposite to the grilling side 311 and to be disposed on the heat-radiating side 12 of the housing 1 so as to contact the plate-contacting side 221 of the heat-conductive plate 22, and a pair of opposite lateral sides that extend between the grilling side 311 and the heating side 312. Each of the lateral sides is formed with a handle-mounting flange 32. The heating side 312 of the grill plate 3 is formed with four L-shaped limit projections 313 (see FIG. 2) that extend into the limit groove 127 for positioning the grill plate 3 on the heat-radiating side 12, and is further formed with four positioning stubs 314, each of which is registered with and extends into a corresponding positioning recess 125 when the grill plate 3 is disposed on the heat-radiating side 12.

Figure 6:
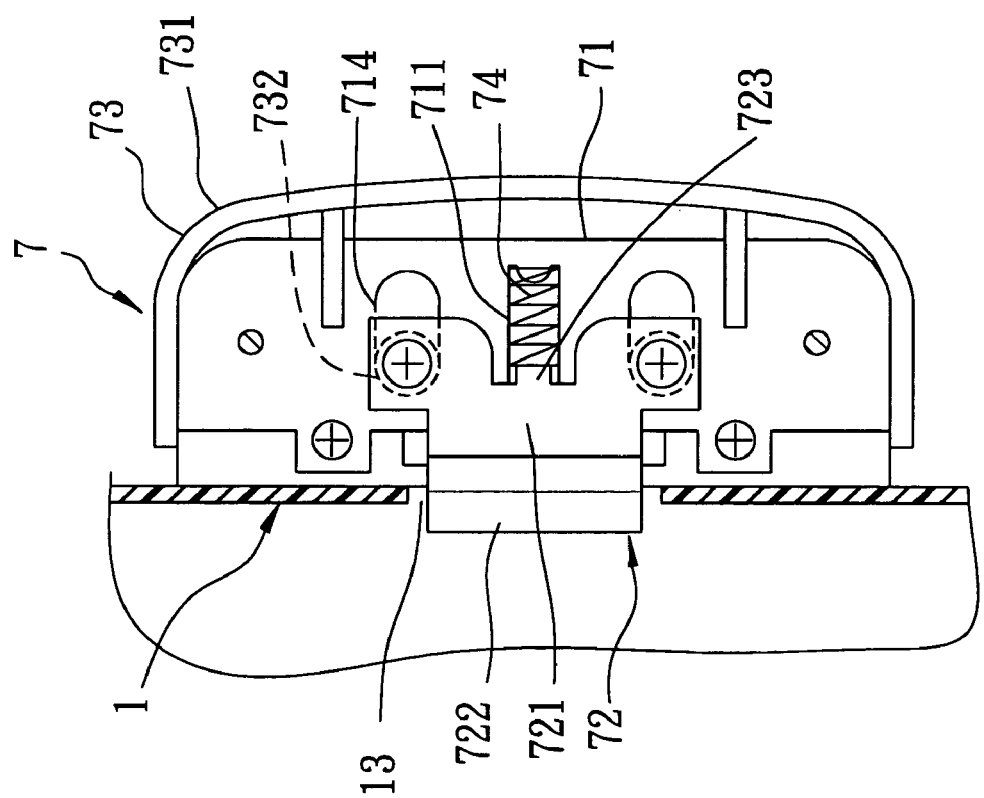
FIG. 6 is a fragmentary schematic bottom view to illustrate the handle unit when retaining a grill plate on a housing of the lower grill member.

The handle units 7 are movably retained on the grill plate 3 and are capable of releasable engagement with the latch holes 13 in the housing 1. The handle units 7 thus serve as latch means for locking releasably the grill plate 3 on the housing 1. Referring to FIGS. 5, 6 and 7, each handle unit 7 includes an anchoring member 71, a movable engaging member 72, a movable handle cover 73, a biasing member 74, and a handle base 75.

The anchoring member 71 is secured to one of the handle-mounting flanges 32 of the grill plate 3, and is formed with a guiding slot 711 and a pair of positioning slots 714. The guiding slot 711 has an engaging end 712 and a disengaging end 713. Each of the positioning slots 714 has an engaging end 715 and a disengaging end 716.

The engaging member 72 is disposed on one side of the anchoring member 71, and has a base portion 721, an engaging portion 722 extending from the base portion 721 for engaging releasably the corresponding latch hole 13 in the housing 1, and a guiding portion 723 that projects from the base portion 721 and that extends into and that is movable along the guiding slot 711.

The handle cover 73 is disposed on another side of the anchoring member 71 opposite to the engaging member 72, and has a cover body 731 and a pair of connecting post 732, each of which projects from the cover body 731, extends through and is movable along a corresponding one of the positioning slots 714, and is connected to the base portion 721 of the engaging member 72.

The biasing member 74 is disposed in the guiding slot 711, and provides a biasing force that acts on the guiding portion 723 of the engaging member 72, thereby urging the engaging member 72 and the handle cover 73 to move such that the guiding portion 723 and the connecting posts 732 are disposed proximate to the engaging end 712, 715 of the respective one of the guiding and positioning slots 711, 714 and such that the engaging portion 722 is able to engage removably the stepped periphery 126 of the corresponding latch hole 13 in the housing 1.

The handle base 75 is mounted to the anchoring member 71 and cooperates with the handle cover 73 to enclose the anchoring and engaging members 71, 72.

Figure 9:
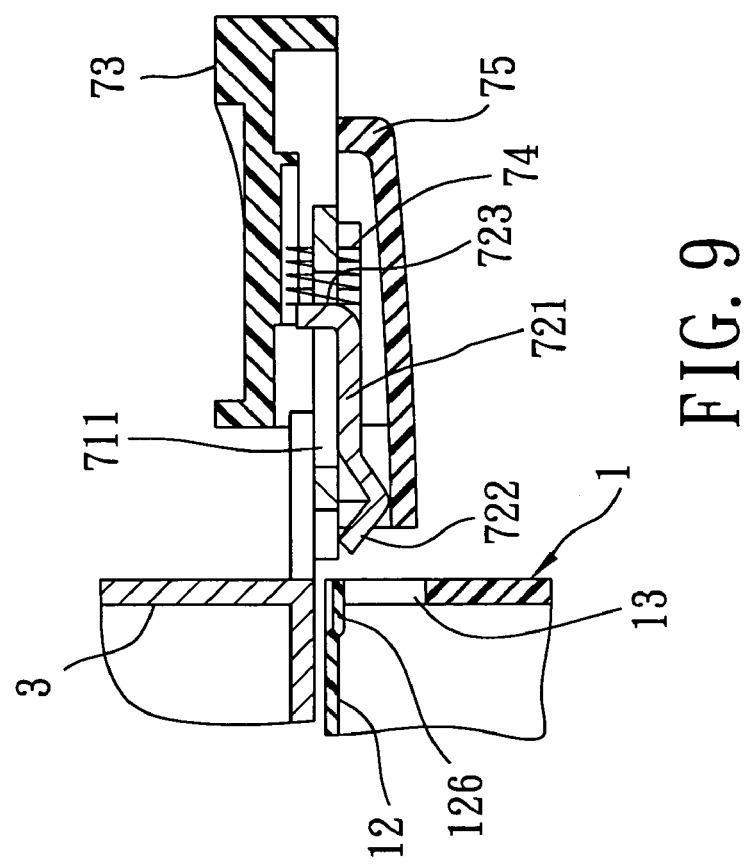
FIG. 9 is a fragmentary schematic sectional view of the handle unit when in the state shown in FIG. 8.
Figure 8:
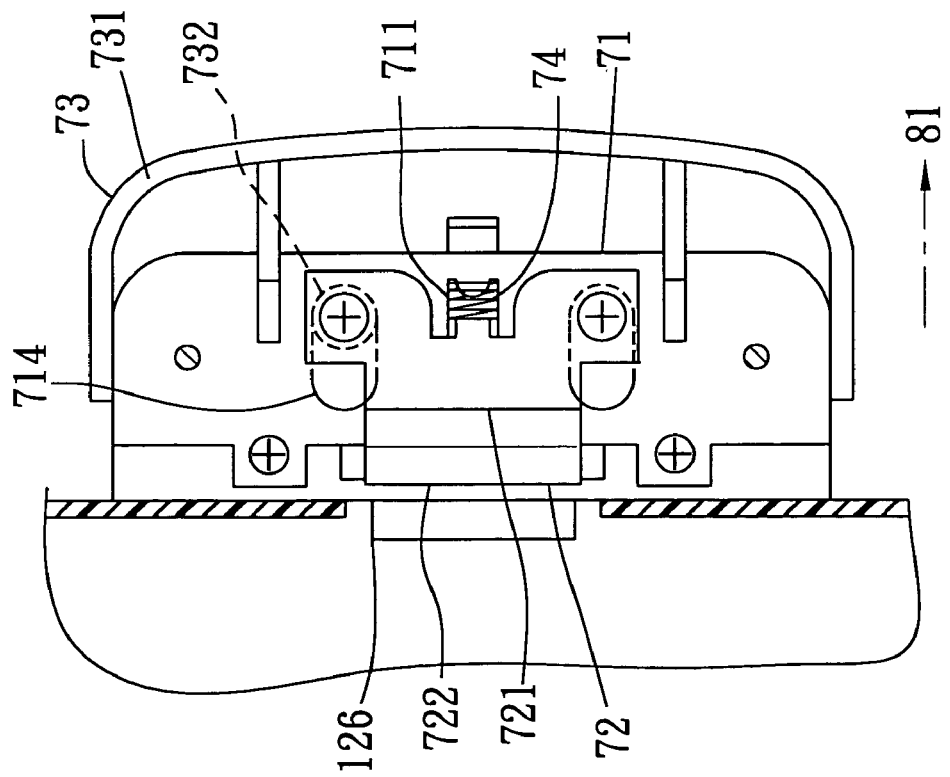
FIG. 8 is a view similar to FIG. 6, but illustrating the handle unit when operated to permit removal of the grill plate from the housing.

Referring to FIGS. 8 and 9, when the handle cover 73 is operated to move away from the grill plate 3 in a direction 81 shown in FIG. 8, this results in corresponding movement of the engaging member 72 against the biasing force of the biasing member 74 such that the guiding portion 723 and the connecting posts 732 are disposed proximate to the disengaging end 713, 716 of the respective one of the guiding and positioning slots 711, 714 and such that the engaging portion 722 is able to disengage from the corresponding latch hole 13 in the housing 1. The grill plate 3 can be lifted away from the housing 1 at this time.

It is apparent from the foregoing that, in the grill device of the present invention, the handle units 7 not only serve the purpose of facilitating handling of the grill device, but further serve as latch means for locking releasably the grill plates 3, 6 on the housings 1, 4 of the upper and lower grill members 9, 8. Moreover, due to the heat-conductive plates 22 of the heating units 2, 5, the heating elements 21 of the heating units 2, 5 remain concealed upon removal of the grill plates 3, 6, thereby protecting the interior of the grill device from damage.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

The invention claimed is:

1. A grill device comprising a grill member that includes:
   a housing formed with a latch hole;
   a grill plate made of a heat-conductive material and disposed removably on said housing;
   a heating unit mounted on said housing and operable so as to generate heat that is conducted to said grill plate; and
   a handle unit movably retained on said grill plate, and the handle unit being in releasable engagement with said latch hole in said housing, thereby locking releasably said grill plate on said housing;
   wherein said handle unit comprises:
   an anchoring member secured to said grill plate and formed with a guiding slot and a positioning slot, each of which has an engaging end and a disengaging end;
   a movable engaging member disposed on one side of said anchoring member, said movable engaging member having an engaging portion in releasable engagement with said latch hole in said housing, and a guiding portion that extends into and that is movable along said guiding slot;
   a movable handle cover disposed on another side of said anchoring member opposite to said moveable engaging member, said handle cover having a connecting post that extends through and that is movable along said positioning slot and that is connected to said moveable engaging member; and
   a biasing member disposed in said guiding slot and providing a biasing force that acts on said guiding portion of said moveable engaging member, thereby urging said moveable engaging member and said handle cover to move such that said guiding portion and said connecting post are disposed proximate to said engaging end of the respective one of said guiding and positioning slots and such that said engaging portion is able to engage said latch hole in said housing;
   said handle cover being movable away from said grill plate to result in corresponding movement of said moveable engaging member against the biasing force of said biasing member such that said guiding portion and said connecting post are disposed proximate to said disengaging end of the respective one of said guiding and positioning slots and such that said engaging portion is able to disengage from said latch hole in said housing.

2. The grill device as claimed in claim 1, wherein said latch hole is defined by a stepped periphery for engaging removably said engaging portion of said moveable engaging member.

3. The grill device as claimed in claim 1 wherein said handle unit further includes a handle base that cooperates with said handle cover to enclose said anchoring and moveable engaging members.

4. The grill device as claimed in claim 1, wherein said heating unit includes a heating element disposed in said housing, and a heat-conductive plate mounted on said housing and disposed between said heating element and said grill plate for conducting heat from said heating element to said grill plate.

5. The grill device as claimed in claim 4, wherein said housing has a heat-radiating side that is formed with a first opening, said heat-conductive plate being mounted on said heat-radiating side and spanning said first opening, said heating unit further including a heat insulator disposed between said heat-conductive plate and said heat-radiating side to prevent contact therebetween, said heat insulator being formed with a second opening that is registered with said first opening, said heating element extending into said first and second openings and being in contact with said heat-conductive plate.

6. The grill device as claimed in claim 5, wherein said grill plate is disposed on said heat-radiating side and is in contact with said heat-conductive plate.

7. The grill device as claimed in claim 6, wherein said heat-radiating side is formed with a mounting region and a surrounding region that surrounds and that forms a vertical clearance with said mounting region, thereby configuring said heat-radiating side with a mounting space surrounded by said surrounding region, said heat insulator and said heat-conductive plate being disposed in said mounting space and cooperating with said surrounding region to form a limit groove around said heating unit, said grill plate being formed with at least one limit projection that extends into said limit groove for positioning said grill plate on said heat-radiating side.

8. The grill device as claimed in claim 6, wherein said heat-radiating side is formed with a positioning recess, and said grill plate is formed with a positioning stub that extends into said positioning recess when said grill plate is disposed on said heat-radiating side.

* * * * *